United States Patent
Price et al.

(10) Patent No.: US 8,201,100 B2
(45) Date of Patent: Jun. 12, 2012

(54) METADATA DRIVEN CONTROL OF NAVIGATIONAL SPEED THROUGH A USER INTERFACE

(75) Inventors: William Pat Price, Rhome, TX (US); Timothy Elliott, Huntington Beach, CA (US); Marcus P Apitz, Yorba Linda, CA (US); Peter Schwartz, Fullerton, CA (US); Jeffrey Briller, Sherman Oaks, CA (US)

(73) Assignee: Vizio Inc., Irvine, CA (US)

( * ) Notice: Subject to any disclaimer, the term of this patent is extended or adjusted under 35 U.S.C. 154(b) by 919 days.

(21) Appl. No.: 12/204,522

(22) Filed: Sep. 4, 2008

(65) Prior Publication Data
US 2010/0058223 A1   Mar. 4, 2010

(51) Int. Cl.
*G06F 3/048* (2006.01)
*H04N 9/64* (2006.01)

(52) U.S. Cl. ........ 715/784; 715/787; 715/802; 348/719; 348/720

(58) Field of Classification Search .................. 715/733, 715/740–747, 760, 764, 765, 810–811, 817–820, 715/825, 829–831, 834–835
See application file for complete search history.

(56) References Cited

U.S. PATENT DOCUMENTS

| | | | |
|---|---|---|---|
| 6,721,953 B1* | 4/2004 | Bates et al. | 725/39 |
| 2003/0151621 A1* | 8/2003 | McEvilly et al. | 345/744 |
| 2006/0248470 A1* | 11/2006 | Lee et al. | 715/784 |
| 2007/0061724 A1* | 3/2007 | Slothouber et al. | 715/716 |
| 2008/0244637 A1* | 10/2008 | Candelore | 725/28 |
| 2009/0094643 A1* | 4/2009 | Pickelsimer et al. | 725/39 |
| 2009/0150814 A1* | 6/2009 | Eyer et al. | 715/765 |
| 2010/0118211 A1* | 5/2010 | Carlsgaard et al. | 348/734 |

* cited by examiner

*Primary Examiner* — Tuyetlien Tran
*Assistant Examiner* — Abimbola Ayeni
(74) *Attorney, Agent, or Firm* — Law Office of Scott C Harris Inc

(57) ABSTRACT

Scroll wheels have simplified the movement of cursors and changes in focus as a users navigate their way through menus, lists, tables, and other objects typically found in graphical user interfaces. Also typical of navigation schemes driven by scroll wheels is the ability of the user to accelerate the rate of movement of the cursor or focus by spinning the scroll wheel faster. One issue with this behavior is that a user who over accelerates the scroll wheel will often wind up overshooting his intended target and reversing the direction of the scroll wheel several times. The embodiment addresses this problem by giving control of the speed of the cursor or focus movement to the object being navigated. If the granularity of the list, table, menu, or other objects become smaller, the object has the ability to filter the speed input of the scroll wheel.

20 Claims, 4 Drawing Sheets

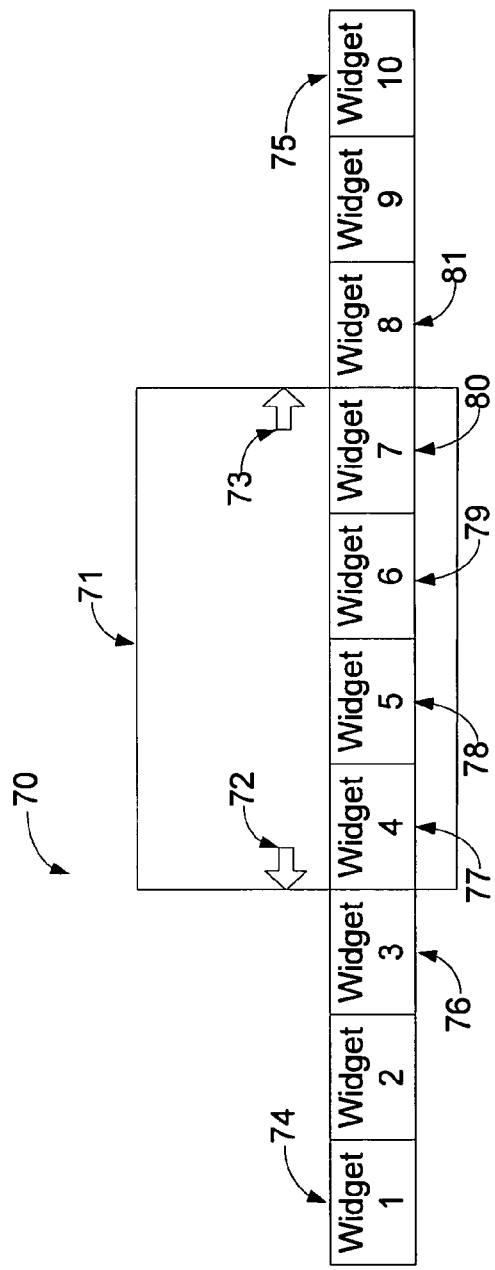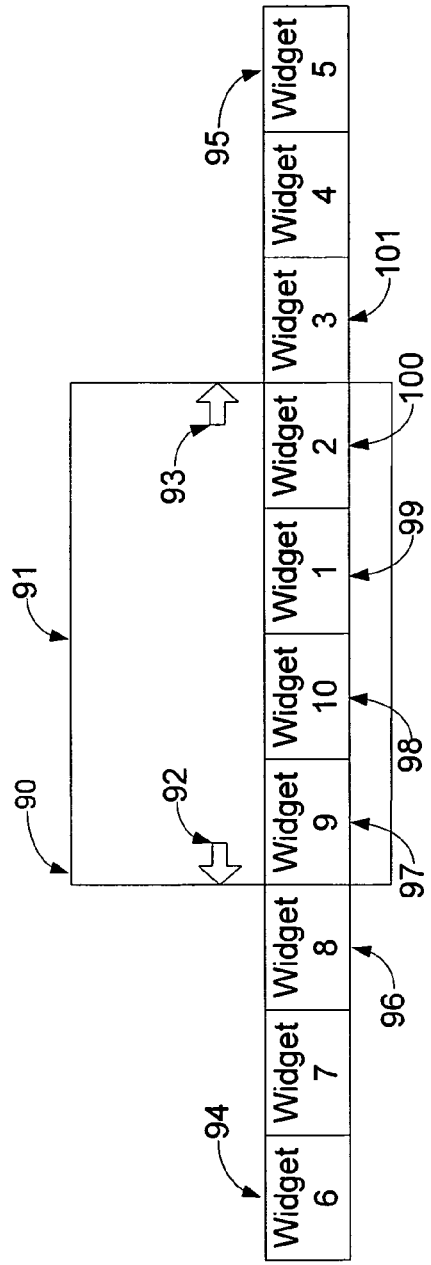

METADATA DRIVEN CONTROL OF NAVIGATIONAL SPEED THROUGH A USER INTERFACE

BACKGROUND

Users of laptop and desktop computer systems on the whole tend to be more sophisticated and are better equipped to adopt new technology. Television viewers on the other hand include not only the sophisticated computers users but also everyone else. Non-sophisticated users tend to have problems with newer technology such as widget based applications and new modern navigation schemes for moving around forms, tables, as well as objects that have been present on computers and starting to make themselves seen on televisions.

One modern navigation devices is the scroll wheel. This device is in essence a wheel mounted perpendicular to a top surface of a mouse or flat on portable personal media players.

SUMMARY

It is an object of the present invention to simplify and make the user of a scroll wheel mounted on a television hand held remote control device more user friendly to a plurality of users of the television.

BRIEF DESCRIPTION OF THE DRAWINGS

Embodiments of the present invention are illustrated by way of example, and not by way of limitation. The following figures and the descriptions both brief and the detailed descriptions of the invention refer to similar elements and in which:

FIG. 4A is a depiction of a digital television screen with a number of widgets displayed with the first widget to the left of the viewable area of the screen.

FIG. 4B is a depiction of a digital television screen with a number of widgets displayed with first widget present in the viewable area of the screen.

DETAILED DESCRIPTION OF THE INVENTION

One mode of operation of a scroll wheels is to cause the cursor or pointing display to move faster as the person using the scroll wheel causes the wheel to rotate faster. The inventors found that this can become confusing to a non-sophisticated user because they typically will overshoot the target there were moving toward on the screen.

An embodiment is intended to correct this problem by giving the applications being used the ability to moderate the speed with which the display cursor moves about the fields displayed on the screen.

Figure 1:
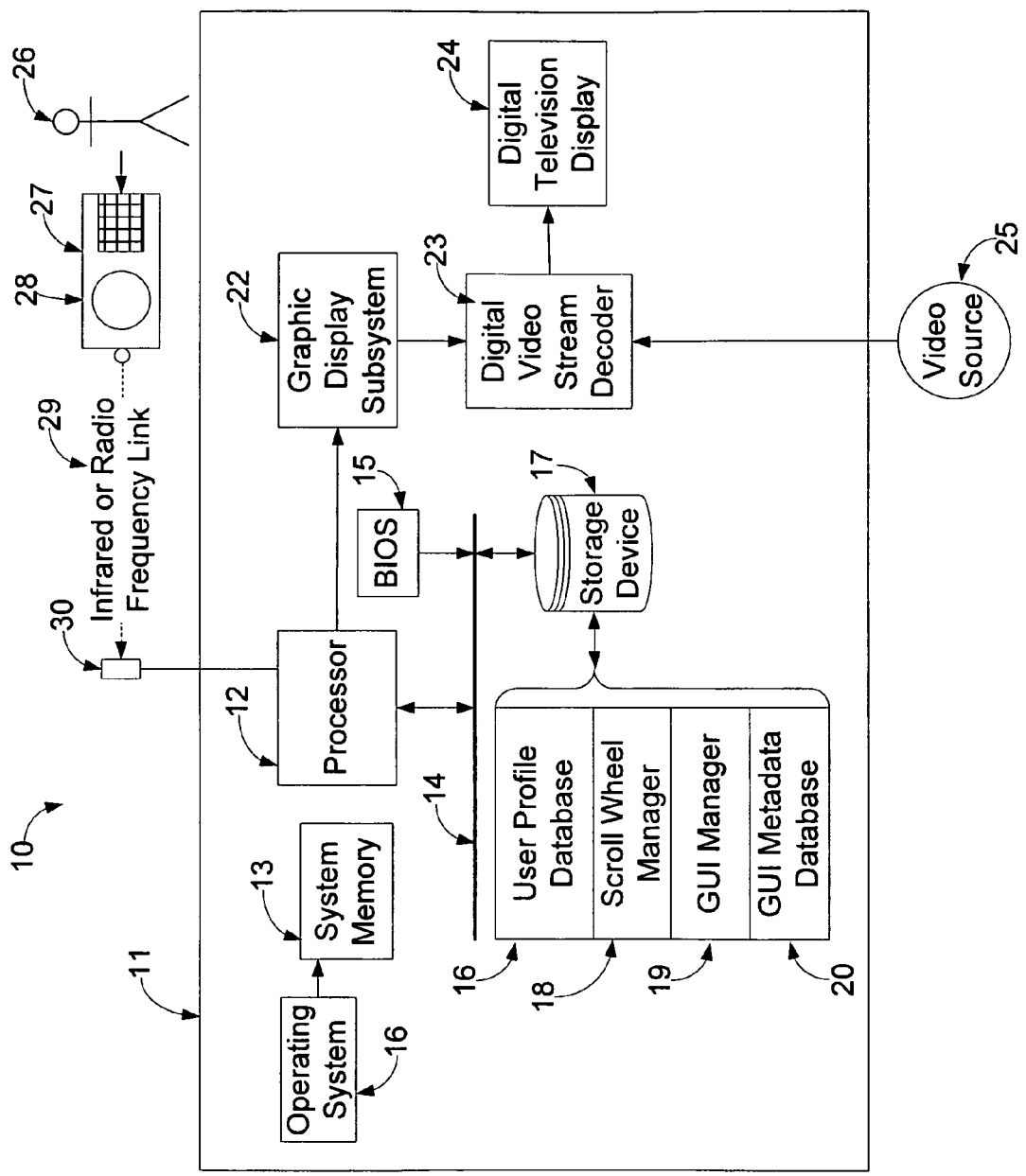
FIG. 1 is a depiction of one embodiment of a digital television system that would incorporate the present invention.

FIG. 1 shows a high level block diagram of a typical digital television 10. In the preferred embodiment digital television 11 is comprised of a processor/TV all in one chip 12, system memory 13, a system bus 14, a BIOS 15, an operating system 16, a storage device 17, a graphic display subsystem 22, digital video stream decoder 23, and a digital television display 24. Storage device 17 may be any of a plurality of storage types including rotating magnetic hard disk drive, flash memory devices, or rotating optical devices. Storage device 17 may also be an internal storage device or an external storage device connected via any of a plurality of known busses such as USB, 1394, or of any other available external busses.

A plurality of software applications reside on storage device 17 such as operating system 16, scroll wheel manager 18 and gui manager 19. A plurality of databases such as gui metadata database 20 and user profile database 21 also reside on storage device 17.

At boot time, BIOS 15 loads operating system 16 from storage device 17 into system memory 13 and passes control of processor 12 to operating system 16. Operating system 16 loads application software and data from storage device 17 as needed for the operation of digital television 11.

Digital video stream decoder 23 receives video streams from video source 25, decodes the streams and sends signals to digital television display 24 which may be any of a plurality of display devices such as LCD panels, plasma panels, three gun displays such as back or front projectors, DLP projectors, or other types of digital display devices.

Digital video stream decoder 23 also receives data from graphic display subsystem 22. Graphic display subsystem 22 acts much the same as a graphics card or circuitry found on personal computers. In the preferred embodiment graphic display subsystem 22 sends signals to digital video stream decoder 23 which acts, in this embodiment, as a video switch and overlays the images or signals received from graphic display subsystem 22 on top of the video images decoded from video source 25.

Software application GUI manager 19 is one of a plurality of software applications loaded into system memory by operating system 16. GUI manager 19 presents graphical images via processor 12 to graphical display subsystem 22 which in turn are processed and sent to digital video stream decoder 23. In another embodiment, however, the process can be controlled using firmware or other non-software processes.

User 26 presses button on hand held remote control device 27. User 26 also rotates scroll wheel 28 on hand held remote control device 27. These controls on hand held remote control device 27 are converted to command data and communicated to digital television via infrared or radio frequency link 29 which is received by receiver 30 and sent to processor 12. Software application scroll wheel manager receives the command data from processor 12, interprets said command data and passes it to GUI manger 19. GUI manager 19 uses said command data to move the focus of objects displayed on the digital television display 24.

User 26 can move the "focus" of the command navigation around from one field to another by pressing navigation buttons on hand held remote control device 27. Typically there are 4 navigation buttons on a hand held remote control device including left and right arrows and up and down arrows. Scroll wheels such as scroll wheel 28 generates successive navigation commands when scroll wheel 28 is rotated in a clock wise or counter clock wise direction. Left and right scroll wheel data is context sensitive in that rotating scroll wheel clockwise will result in focus of horizontal fields or objects moving from left to right. Counter clockwise rotation of scroll wheel 28 will result in focus of horizontal fields or objects moving from right to left. For vertically arranged fields or objects clockwise rotation of scroll wheel 28 will result in focus of vertical fields or objects moving from bottom to top. Counter clockwise rotation of scroll wheel 28 will result in focus of focus of vertical fields or objects moving from top to bottom.

Some scroll wheel software managers will measure the time between commands. When the time between identical scroll wheel commands decreases to some predetermined value the software manager detects that the user has accelerated the rotation of the scroll wheel. When this is detected, scroll wheel software managers, typically send either additional movement commands to GUI mangers or different movement commands to GUI managers indicating to the manager that focus movement should be accelerated. The ability of the user to accelerated the movement of focus change is both an advantage and a problem. When GUI displays contain large numbers of fields or objects that can be focused on, the ability to accelerate the focus movement allows a user to get to a desired field or object much quicker than he could by simply pressing an arrow button or by being limited to a single speed of a scroll wheel.

The downside of unlimited acceleration is that some GUI displays build up delays in processing the current focus change request from the user. The result is that the desired object to come into focus may be and often is bypassed by an impatient user. This is the problem case the present invention solves.

Figure 2:
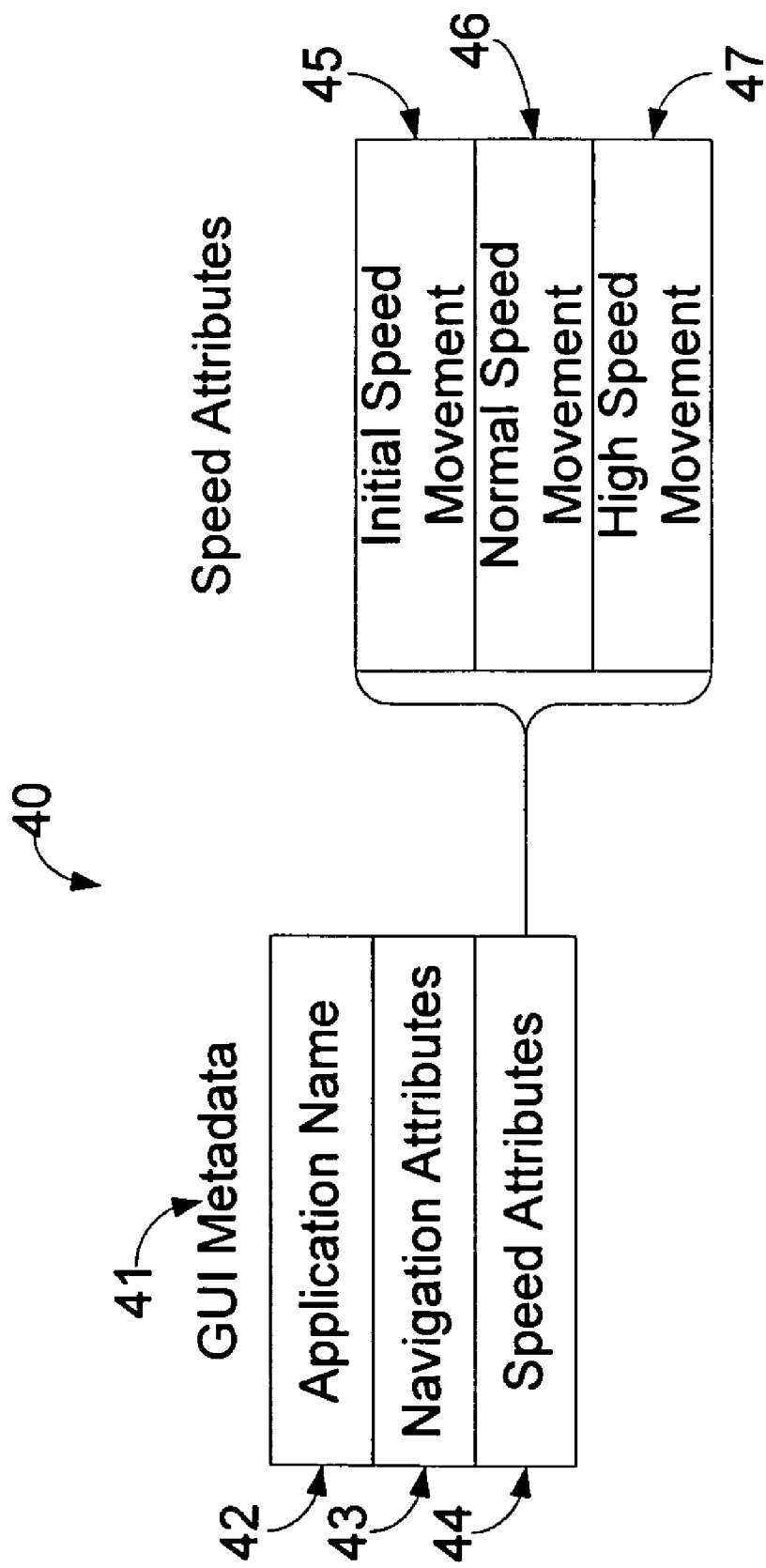
FIG. 2 is a depiction of the GUI metadata database format with the speed attributes further shown.
Figure 3:
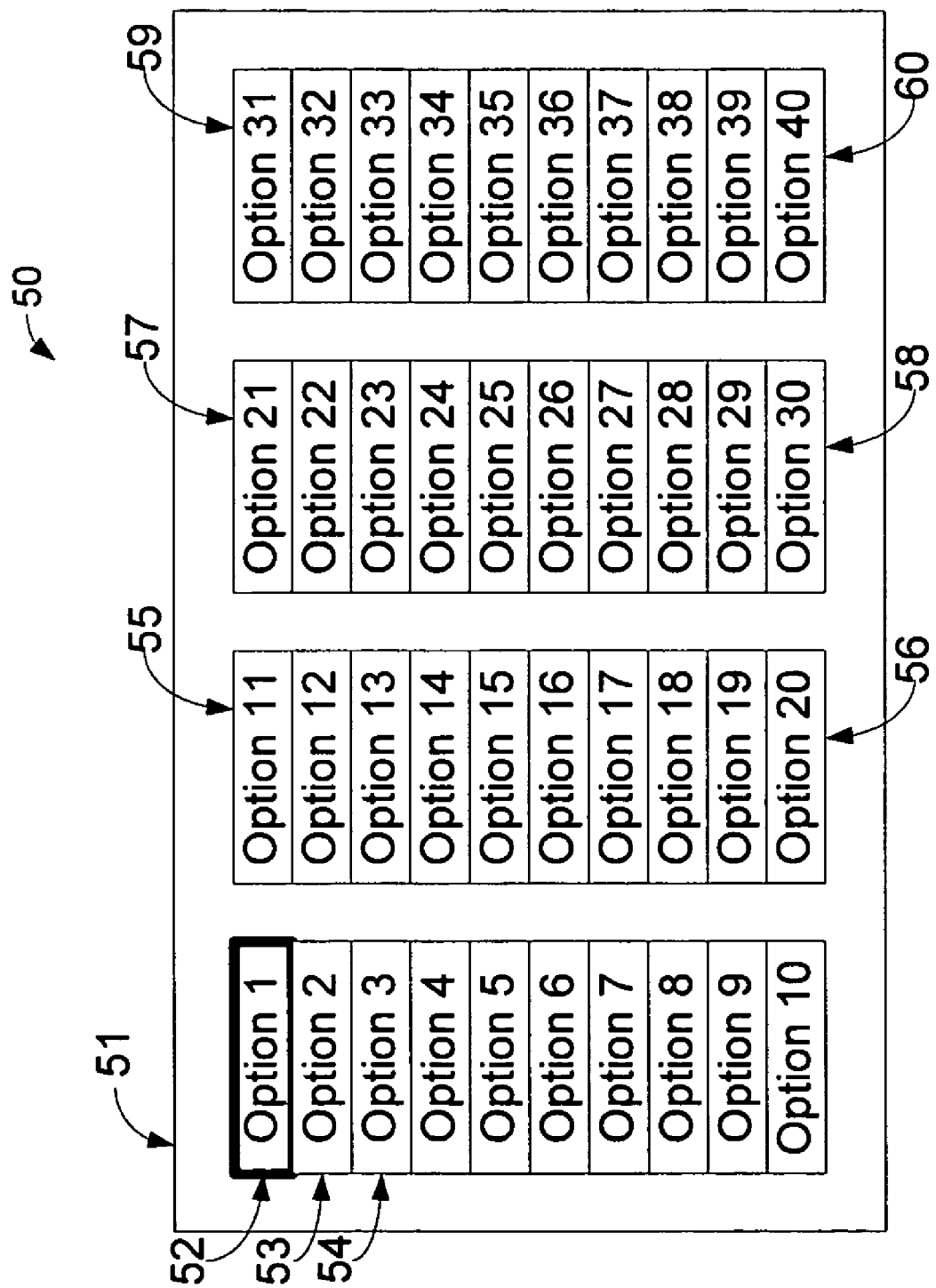
FIG. 3 is a depiction of a digital television screen with a GUI showing 40 navigable fields.

Now referencing FIG. 2 where 40 depicts GUI metadata 41 which is a portion of GUI metadata database 20. GUI metadata 41 includes application name 42, navigation attributes 43, and speed attributes 44. Speed attributes 44 contains limits on the speed at which the focus change can occur. There may be a plurality of limits based on a plurality of schemes such as initial speed, normal speed, and high speed. Speed attributes 44 in the preferred embodiment may have 3 attributes as initial speed movement 45, normal speed movement 45, and high speed movement 47. For example, reference FIG. 3 where 50 depicts a GUI display on display screen 51. The GUI of the embodiment shows 40 fields or objects that can be brought into focus by the user manipulating scroll wheel 28 on hand held remote control device 27. In this embodiment, note that option 1 50 is in focus by virtue of its border being heavier than that of the adjacent fields. In the environment of this embodiment, moving from option 1 52 to option 2 53 may be problematic at best if the user cannot move or rotate the scroll wheel very slowly. If the user moves the scroll wheel more than one increment the focus would most probably jump from option 1 52 to option 3 54 or further down the option column. Moreover, the inventors found that moving this kind of device by only a single increment may be extremely difficult to discern. In this environment, initial speed movement 45 would most probably be set to a low value. These values may have a plurality of settings in terms of movement such as one increment of scroll wheel 28 causes focus to change to an adjacent field or object. A value of 2 may cause focus to change 2 fields or objects.

Speed attributes 44 may also contain time elements. For example, all 3 speed attributes, initial speed movement 45, normal speed movement 46, and high speed movement 47 may be time based; where movement is only based on the fact that the user is rotating scroll wheel 28. Movement of the focus would be constant for so many seconds (initial speed movement 45) and if user 26 continues moving scroll wheel 28 the movement of focus would be increased for some period of seconds (normal speed movement 46) and would increase again to the highest speed (high speed movement 47) if user 26 was still rotating scroll wheel 28.

Reference FIGS. 4A 70 and 4B 90 which are 2 depictions of a digital display 71 and 91. In FIG. 4A 70, digital display 71 is shown with 4 objects referred to in this figure as widgets. The widgets 77-80 are presented in the confines of digital display 71. Widget 1 74 through widget 3 75 are shown to the left of digital display 71 or off display left. Widget 1 74 is the first widget in the sequence of 10 widgets shown. Widget 4 77, widget 5 78, widget 6 79 and widget 7 80 are positioned on screen or within the confines of digital display 71. Widget 8 81 through widget 10 75 are shown to the right of digital display 71 or off display right. Left arrow 72 and right arrow 73 are navigational aid displays to indicate to the user that more widgets are available by moving right or left with the arrow buttons on hand held remote control device 27 or by rotating scroll wheel 28 on hand held remote control device 27. If the user rotates scroll wheel clockwise 5 increments, the widgets move to the left 5 places. The right most widget in FIG. 4A widget 6 79 will rotate around to the first position on the far left of the widget line up. After a total of 5 moves, the widget line up will be as shown in FIG. 4B. The number of move increments from FIG. 4A to FIG. 4B is 5 in either direction. As the total number of widgets increases speed attributes 44 may be updated to have different values in initial speed movement 45, normal speed movement 46, and high speed movement 47. For example, high speed movement 47 may be 2 object movements for one incremental rotation of scroll wheel 28 where there is a total of 10 widgets. If the number of widgets increases to some larger number such as 100 for example, the high speed movement 47 may be changed to 4 or 6 object movements for each incremental movement of scroll wheel 28. Using time as a variable, high speed movement 47 may be 2 object movements for the first 3 seconds of incremental rotation of scroll wheel 28 where there is a total of 10 widgets. If the number of widgets increases to some larger number such as 100 for example, the high speed movement 47 may be changed to 4 or 6 object movements for each additional second of incremental movement of scroll wheel 28.

Referencing FIG. 1 10, in an alternate embodiment, user profile database 16 may contain a plurality of data items such as an instance of GUI metadata database 20 for each user of digital television 11. In this embodiment the navigation attributes 43 and speed attributes 44 may be different for each user that logs onto digital television 11. In this embodiment software application GUI manager 19 may monitor the actions of each user when that user is logged onto digital television 11 and may change the speed attributes for the user based on the user's behavior.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art. For example, other items other than widgets can be controlled and displayed in this way.

Also, the inventors intend that only those claims which use the words "means for" are intended to be interpreted under 35 USC 112, sixth paragraph. Moreover, no limitations from the specification are intended to be read into any claims, unless those limitations are expressly included in the claims. The computers described herein may be any kind of computer, either general purpose, or some specific purpose computer such as a workstation. The computer may be a Pentium class computer, running Windows XP or Linux, or may be a Macintosh computer. The computer may also be a handheld computer, such as a PDA, cellphone, or laptop.

The programs may be written in C, or Java, Brew or any other programming language. The programs may be resident on a storage medium, e.g., magnetic or optical, e.g. the computer hard drive, a removable disk or media such as a memory stick or SD media, or other removable medium. The programs may also be run over a network, for example, with a server or other machine sending signals to the local machine, which allows the local machine to carry out the operations described herein.

We claim:

1. An apparatus for controlling a navigation speed of a digital television user interface comprising:
   a digital television system consisting of:
   a processor unit, including a processor;
   at least one internal storage device, storing including a first database portion for storing metadata associated with controlling and managing graphical user interfaces (GUIs);
   a television hand held remote control device with at least a rotary scroll wheel that rotate clockwise and counter clockwise generating data for each direction of rotation;
   a data transmitter that sends data generated by rotation of said scroll wheel to said processor in said digital television;
   said processor operating to receive said data generated by rotation of said scroll wheel and transmitted from said hand held remote control device to said digital television and to interpret said data to determine a direction of rotation and a time between received data, to create an output that displays one of a plurality of different GUIs on a screen of said digital television system, including a first graphical user interface (GUI) and a second GUI, wherein said first and second GUI s display input fields and objects that can be brought into focus by rotation of said scroll wheel, and which are out of focus at motions of said scroll wheel, wherein said processor operates to change the focus of said input fields and said objects displayed on said digital television screen, said focus being changed to a next or previous input field or object is dependent on a value of said data;
   the next or previous input field or object brought into focus is dependent on data contained in a GUI metadata database;
   wherein said GUI metadata database includes a first entry for said first GUI including a first application name for said first GUI and speed attributes for said first GUI that defines a first speed with which said focus is changed to said next or previous input field, and said GUI metadata database includes a second entry for said second GUI including a second application name associated with said second GUI and second speed attributes for said second GUI, and said second speed attributes are different than said first speed attributes, and said second speed attribute defines a second speed at which said focus is changed to said next or previous input field; and
   wherein said speed attributes include all of a lowest speed that is used when an application is started, a fastest speed that is used when a user is requesting a maximum amount of movement among objects within said application, and at least one speed in between said lowest speed and said fastest speed.

2. The apparatus of claim 1 where said first database portion contains records where each record is assigned to a unique GUI display comprising at least:
   a name of the unique GUI display;
   navigation attributes describing the direction of movement to the next and previous input fields and objects displayed on said unique GUI;
   attributes associated with the number of input fields or objects to be advanced to the next input field or object to be brought into focus based on the number or amount of data received from said television hand held remote control device as a function of time; and
   attributes associated with the number of input fields or objects to be advanced to the next input field or object to be brought into focus based on the amount of time data has been received from said television hand held remote control device.

3. The apparatus of claim 1, wherein said output displays plural widgets.

4. The apparatus of claim 3, wherein said output displays only some of a plurality of widgets, and indicates that other widgets are available off the screen, and wherein said scroll wheel allows moving a display to view said other widgets.

5. The apparatus of claim 1, wherein said database stores metadata associated with controlling and managing unique GUIs for each unique user of said digital television which allows each of said unique uses to create different ways to manage said unique GUI.

6. The apparatus of claim 1 where said database includes records, where each record is associated with a unique GUI display having:
   a name of the unique graphical user interface display;
   navigation attributes describing the direction of movement to the next and previous input fields and objects displayed on said unique GUI;
   attributes associated with the number of input fields or objects to be advanced to the next input field or object to be brought into focus based on the number or amount of data received from said television hand held remote control device as a function of time; and
   attributes associated with the number of input fields or objects to be advanced to the next input field or object to be brought into focus based on the amount of time data has been received from said television hand held remote control device.

7. The apparatus of claim 6 where said database:
   contains records where each record is assigned to a unique user of said digital television;
   each said record contains the contents of said first database portion;
   contents of each record of said first database can contain different values dependent on said unique user;
   content of each copy of said first database can contain different values dependent on said unique user and dependent on said user's behavior and further comprising plural additional records, associated with a second unique user, that include different values that are dependent on said second unique user, wherein said speed attributes for said first unique user are different than said speed attributes for said second unique user.

8. The apparatus of claim 7 where said database contains behavioral data that:
   contains computed data showing if said user navigated to previous said input field or objects once the navigation stopped on a subsequent said input field or said object; and
   said computed data used by said application to predict which said input field or said object said user actually wanted said navigation to stop on.

9. The apparatus of claim 1, where said application will cause an audible sound to be played over the audio system of said digital television, said audible sound:
   may be any of a plurality of sounds maintained in said database; and
   said sounds may be muted on direction from said user.

10. A method for controlling a navigation speed of a digital television user interface comprising:
- using a processor for controlling functions of displaying television content on a television screen;
- storing a database including data that defines controlling and managing graphical user interfaces (GUIs);
- receiving commands in a format, from a television hand held remote control device, said commands including at least commands from a rotary scroll wheel that rotate clockwise and counter clockwise generating unique data for each direction of rotation;
- interpreting said data to determine a direction of rotation and a time between received data, to create an output that displays one of a plurality of GUIs on said digital television screen;
- displaying input fields and objects;
- bringing at least some of said objects into focus by rotation of said scroll wheel, and which are out of focus at motions of said scroll wheel;
- change the focus of said input fields and said objects displayed on said digital television screen, said focus being changed to a next or previous input field or object is dependent on a value of said data;
- a speed at which the next or previous input field or object brought into focus is dependent on data contained in a graphical user interface (GUI) metadata database and is also dependent on a number of total objects that can be controlled, where the speed at which the next or previous input field or object brought into focus for a first screen with more objects is a faster speed at which the next or previous input field or object brought into focus than another speed for a second screen with fewer objects; and
- wherein said speed at which the next or previous input field or object is brought into focus is defined in said GUI metadata database to include all of a lowest speed that is used when an application is started, a fastest speed that is used when a user is requesting a maximum amount of movement among objects within said application, and at least one speed in between said lowest speed and said fastest speed.

11. The method of claim 10 where said first database contains records where each record is assigned to a unique GUI display comprising at least:
- a name of the unique GUI display navigation attributes describing the direction of movement to the next and previous input fields and objects displayed on said unique GUI;
- attributes associated with the number of input fields or objects to be advanced to the next input field or object to be brought into focus based on the number or amount of data received from said television hand held remote control device as a function of time; and
- attributes associated with the number of input fields or objects to be advanced to the next input field or object to be brought into focus based on the amount of time data has been received from said television hand held remote control device.

12. The method of claim 10, further comprising displaying plural widgets.

13. The method of claim 10, wherein said output displays only some of a plurality of widgets, and indicates that other widgets are available off the screen, and wherein said scroll wheel allows moving a display to view said other widgets.

14. The method of claim 10, wherein said database stores metadata associated with controlling and managing GUIs for each unique user of said digital television which allows each of said unique user to create different ways to manage said graphical user interface.

15. The method of claim 10 where said database includes records, where each record is associated with a unique GUI display having:
- a name of the unique GUI display navigation attributes describing the direction of movement to the next and previous input fields and objects displayed on said unique GUI;
- attributes associated with the number of input fields or objects to be advanced to the next input field or object to be brought into focus based on the number or amount of data received from said television hand held remote control device as a function of time; and
- attributes associated with the number of input fields or objects to be advanced to the next input field or object to be brought into focus based on the amount of time data has been received from said television hand held remote control device.

16. The method of claim 12 where said database:
  i. contains records where each record is assigned to a unique user of said digital television;
  ii. each said record contains the contents of said first database;
  iii. contents of each copy of said first database can contain different values dependent on said unique user; and
  iv. content of each copy of said first database can contain different values dependent on said unique user and dependent on said user's behavior.

17. The method of claim 14 where said second database contains behavioral data that:
- contains computed data showing if said user navigated to previous said input field or objects once the navigation stopped on a subsequent said input field or said object; and
- said computed data used by said second application to predict which said input field or said object said user actually wanted said navigation to stop on.

18. The method of claim 14, where said second application will cause an audible sound to be played over the audio system of said digital television, said audible sound:
- may be any of a plurality of sounds maintained in said first database or said second database; and
- said sounds may be muted on direction from said user.

19. A method for controlling a navigation speed of a digital television user interface comprising:
- using a processor for controlling functions of displaying television content on a television screen;
- storing a database including data that defines controlling and managing graphical user interfaces (GUIs);
- receiving commands in a format, from a television hand held remote control device, said commands including at least commands from a rotary scroll wheel that rotate clockwise and counter clockwise generating unique data for each direction of rotation;
- interpreting said data to determine a direction of rotation and a time between received data, to create an output that displays one of a plurality of graphical user interfaces on said digital television screen;
- displaying input fields and objects;
- bringing at least some of said objects into focus by rotation of said scroll wheel, wherein other objects are out of focus at motions of said scroll wheel;
- changing the focus of said input fields and said objects displayed on said digital television screen, said focus being changed to a next or previous input field or object is dependent on a value of said data;

wherein the next or previous input field or object brought into focus is dependent on data contained in GUI metadata database;

storing behavioral data that: contains computed data showing if said user navigated to previous said input field or objects once the navigation stopped on a subsequent said input field or said object;

said computed data used by said second application to predict which said input field or said object on which said user actually intended to stop; and wherein said GUI metadata database includes speed attributes which include all of a lowest speed that is used when an application is started, a fastest speed that is used when a user is requesting a maximum amount of movement among objects within said application, and at least one speed in between said lowest speed and said fastest speed.

20. The apparatus of claim 1, wherein said application determines a total number of said objects, and adjusts said speed attributes based on the total number of said objects, so that at least said fastest speed is faster for an application that allows selection between a larger number of objects, and said fastest speed is slower for an application that allows selection between a larger number of objects.

* * * * *